United States Patent
Flannery

[11] Patent Number: 5,826,092
[45] Date of Patent: Oct. 20, 1998

[54] METHOD AND APPARATUS FOR PERFORMANCE OPTIMIZATION IN POWER-MANAGED COMPUTER SYSTEMS

[75] Inventor: Michael R. Flannery, Sioux City, Iowa

[73] Assignee: Gateway 2000, Inc., North Sioux City, S. Dak.

[21] Appl. No.: 529,237

[22] Filed: Sep. 15, 1995

[51] Int. Cl.$^6$ .............. G06F 1/00; G06F 1/18; G06F 1/26
[52] U.S. Cl. .............. 395/750.06; 395/750.04; 395/167; 395/556; 395/557
[58] Field of Search ............ 395/750, 550, 395/558, 433, 287, 750.02, 750.03, 750.04, 750.06, 556–557, 560; 711/167, 168–169, 170

[56] References Cited

U.S. PATENT DOCUMENTS

| | | | |
|---|---|---|---|
| 5,125,088 | 6/1992 | Culley | 395/551 |
| 5,159,672 | 10/1992 | Salmon et al. | 395/306 |
| 5,210,858 | 5/1993 | Jensen et al. | 395/550 |
| 5,313,621 | 5/1994 | Chan | 395/550 |
| 5,390,350 | 2/1995 | Chung et al. | 395/750 |
| 5,408,639 | 4/1995 | Gulick et al. | 395/550 |
| 5,438,681 | 8/1995 | Mensch, Jr. | 395/800 |
| 5,448,717 | 9/1995 | Balmer et al. | 395/550 |
| 5,463,756 | 10/1995 | Saito et al. | 711/167 |
| 5,517,649 | 5/1996 | McLean | 395/750 |
| 5,530,879 | 6/1996 | Crump et al. | 395/750 |
| 5,544,351 | 8/1996 | Lee et al. | 395/550 |
| 5,560,017 | 9/1996 | Barrett et al. | 395/733 |
| 5,581,745 | 12/1996 | Muraoka et al. | 395/557 |
| 5,590,341 | 12/1996 | Matter | 395/750 |
| 5,630,148 | 5/1997 | Norris | 395/750 |
| 5,632,038 | 5/1997 | Fuller | 395/750 |
| 5,636,367 | 6/1997 | Stones et al. | 395/494 |
| 5,669,003 | 9/1997 | Carmean et al. | 395/750.04 |
| 5,673,398 | 9/1997 | Takeda | 395/285 |
| 5,717,894 | 2/1998 | Vivio | 711/138 |
| 5,740,404 | 4/1998 | Baji | 711/167 |

*Primary Examiner*—Ayaz R. Sheikh
*Assistant Examiner*—Raymond N. Phan
*Attorney, Agent, or Firm*—Schwegman, Lundberg, Woessner & Kluth, P.A.

[57] ABSTRACT

The performance of a computer system which use reduction of clock speed to conserve power is enhanced by dynamically adjusting the minimum number of clock cycles required for memory access ("wait states"). When the computer system decreases its clock speed, the minimum number of wait states is decreased to account for the longer cycle time. Likewise, when the computer system increases its clock speed, this invention determines whether any increase in the minimum number of wait states is required, and if so, implements such an increase.

7 Claims, 3 Drawing Sheets

FIG. 2

| CPU FREQUENCY | DRAM SPEED | READ CYCLES | WRITE CYCLES |
|---|---|---|---|
| 20MHz | 80ns | 3-2-2-2 | 0 ws |
| 25MHz | 80ns | 3-2-2-2 | 0 ws |
| 33MHz | 70ns | 3-2-2-2 | 1 ws |
| 40MHz | 70ns | 4-3-3-3 | 1 ws |
| 50MHz | 70ns | 5-4-4-4 | 1 ws |

| INDEX | NAME | 7 | 6 | 5 | 4 | 3 | 2 | 1 | 0 |
|---|---|---|---|---|---|---|---|---|---|
| 35h | DRAM CONTROL REGISTER 2 | \multicolumn{2}{} READ WAIT STATES 00=3-2-2-2 01=4-3-3-3 10=4-3-3-3 11=5-4-4-4 | | WRITE WAIT STATES 00=NO WAIT 01=1 10=1 11=RESERVED | | | | | |

METHOD AND APPARATUS FOR PERFORMANCE OPTIMIZATION IN POWER-MANAGED COMPUTER SYSTEMS

FIELD OF INVENTION

The present invention relates to reducing power consumption in computers, and in particular to a method and apparatus for controlling the number of memory access wait states with changes in the system clock speed.

BACKGROUND OF INVENTION

Portable and lap-top computers have become widely used and are increasing in popularity. An advantage of such computers is that they can be operated with the use of batteries without the need of an external power supply. One limitation faced by these portable computers is that their batteries have a limited life. A typical battery pack generally needs to be recharged after every two (2) to four (4) hours of use. Hence an efficient power management scheme is essential in order to allow these computers to run as long as possible without requiring the recharging of their batteries. Power management has also become an issue with respect to desktop and floor-standing computers because it is increasingly important to build environmentally friendly computers which consume less power. In addition, reduced power consumption also lowers heat dissipation and increases the reliability of a system.

A commonly used scheme for managing the power of computer systems involves the reduction of the processor clock speed during periods of inactivity or on a continuous basis when a computer system is operated under battery power. With such a scheme, the performance of the system invariably suffers because fewer instructions are performed per second.

The clock speed is only one factor upon which the performance of a computer system depends. Another important factor affecting the performance of a system is the speed at which the microprocessor reads from and writes to system memory. Microprocessors generally operate at clock speeds that are much higher than the rate at which memory can supply or receive data. Therefore, a microprocessor must wait whenever an operation requires a read or write to memory. The number of clock cycles that the microprocessor must wait is described in terms of "wait states," and for any particular system the number of wait states that will be used is programmed into the system's memory controller by the system's basic input and output system ("BIOS") firmware.

In many computer systems, performance is enhanced through the use of a high-speed memory cache, external to the microprocessor, that minimizes the performance impact of using slower memory, such as DRAM, for the system memory. However, in many power-managed computer systems such as portables and lap-tops, an external high-speed memory cache is not employed due to power, space, or cost limitations. This means that the performance of such a system is largely determined by the number of wait states, i.e. the number of clock cycles that is required for the processor to read from and write to the system memory.

In current computer systems, the number of wait states remains fixed during the operation of the system and is determined based on the minimum number of complete clock cycles (or partial clock cycles in some specialized systems) that are needed to meet the worst-case access timing of the system memory subsystem when the microprocessor is running at its maximum speed. The BIOS firmware is designed to program the memory controller to a fixed number of wait states. This number is determined by the system designer and is based on the maximum clock speed of the microprocessor and the worst-case access time scenario for the memory so as to ensure that only the right data is read from and written to memory. For instance, the length of each clock cycle of a microprocessor which runs at 50 MFTZ will be its reciprocal, which would be 20 nanoseconds. Assuming that the memory requires 70 ns for an access, the memory controller would have to be programmed for three wait states (i.e., the processor would wait three cycles and then receive the data on the fourth). This results in a total of 80 ns for the memory access since the processor must do these operations in complete cycles.

In existing power-managed computer systems, the number of wait states remains the same regardless of the clock speed of the processor. For instance if the clock speed of the processor is reduced from 50 MHz to 25 MHz (i.e., the cycle time increases from 20 ns to 40 ns), since the number of wait states remain unchanged (i.e., three wait states), memory access will now take 160 ns instead of 80 ns even though the access time of a memory device does not change with clock speed. In other words, the data will be available after 70 ns and the processor will wait 90 ns after the data is available before it will actually receive the data This results in a substantial degradation of performance.

In one proposed solution for conserving power, the use of a set of system/memory controller chips allow instantaneous clock speed changes. Specifically, this method involves the lengthening of the processor clock cycle, up to the amount necessary to allow for the access of system memory which provides data independently of the processor clock. This allows the system to be configured to exactly match the time it takes for the processor to access the system memory to the system memory subsystem's worst case access time. However, such a system requires a processor that supports instantaneous clock speed changes, which is not widely available. In addition, the system memory timing is still treated as a constant when the processor clock speed is reduced.

Another approach for power management is to process a task at maximum clock speed, so that the task will be completed in the least amount of time, and then to reduce the clock speed to save power during idle periods. For instance, consider the power consumed in one second in a scenario where a task would take a computer system operating at maximum clock speed x, 100 milliseconds to accomplish. Under this first approach, the system would initially operate at its maximum clock speed of x and complete the task in the shortest possible time, which in this case is 100 ms. Afterwards, assuming that the system does not have to immediately perform another task, the system would go into a low power state at one-half the clock speed, x/2. At this slower clock speed, the system remains idle for the following 900 ms which results in lower power consumption. With this method, the goal is to provide the user with good apparent system speed, while using less total power than if the clock speed remained fixed at maximum speed over the entire second.

Yet another approach for power management is to reduce the clock speed when the computer is in a power conservation mode. For instance, a computer system may allow the user to set the clock speed to a reduced rate such as one-half the maximum speed, x/2, in order to save power and thus increase the battery life. However, once the system clock speed is reduced to one half of its maurur, depending upon the specific task the system is trying to achieve, the processing time may double. In other words, a task which would take 100 ms if the processor is running at maximum speed may take 200 ms after the clock speed has been halved and would consume less power. At the end of the 200 ms, the system would then go into an idle state for the rest of the second which would be 800 ms. Generally the apparent reduction of performance will depend on the type of application being used. Computation-intensive applications will obviously suffer the most performance penalty. The tradeoff is that while less total power may be consumed in this case than operating at maximum speed, the user will experience serious performance degradation since each individual task will take longer to complete.

Accordingly, there is a need for a power management scheme which achieves power conservation with minimal performance degradation.

BRIEF SUMMARY OF INVENTION

The present invention achieves significant performance advantages by controlling the number of clock cycles used for system memory access in power-managed computer systems that employ processor clock speed modification. A memory controller is reprogrammed to the optimal number of wait states for any given processor clock speed, when the clock speed is changed. In one embodiment, when the clock speed is reduced from 50 to 25 Nm (20 ns to 40 ns clock cycle time), the memory controller is reprogrammed to instruct the processor to wait one cycle before attempting to receive data retrieved from memory. This results in the processor receiving the data in two cycles, i.e., 80 ns instead of 160 ns. In other words, the new number of clock cycles used is the lowest number possible based on the new clock speed and the worst-case access time of the system memory subsystem One benefit of the present invention is that the system clock speed may be reduced to save power, yet the system performance observed by a user remains similar to that when the processor is running at its maximum clock speed. Even if some performance degradation occurs, it is usually much less than in the case where the number of wait states remains constant during clock speed reduction. It thus provides the user with a system with acceptable performance while at the same time conserving precious battery power.

In one embodiment, prior to setting the clock speed to a higher value, the memory controller first resets the number of wait states. This is done when power conservation is no longer desired. It ensures that the processor will wait long enough for the data when increasing the clock speed.

In a further preferred embodiment, the clock speed is reduced during times of inactivity. The system still performs certain background functions when it is in the reduced clock speed state. By modifying the number of wait states in accordance with the present invention the system completes those background functions more quckly and therefore moves to a completely idle state more quickly, conserving even more power.

Other objects and advantages of the invention will become apparent upon reading the following detailed description and upon reference to the drawings.

BRIEF DESCRIPTION OF THE DRAWINGS

FIG. 2 is a chart of processor speeds, DRAM speeds, and the number of cycles required for reading and writing data.

FIG. 3 is a block representation of a DRAM control register and selected values in certain bit positions of the register.

DETAILED DESCRIPTION OF PREFERRED EMBODIMENTS

In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures. Signals and connections may be referred to by the same number or label, and the actual meaning should be clear from the context of use.

Figure 1:
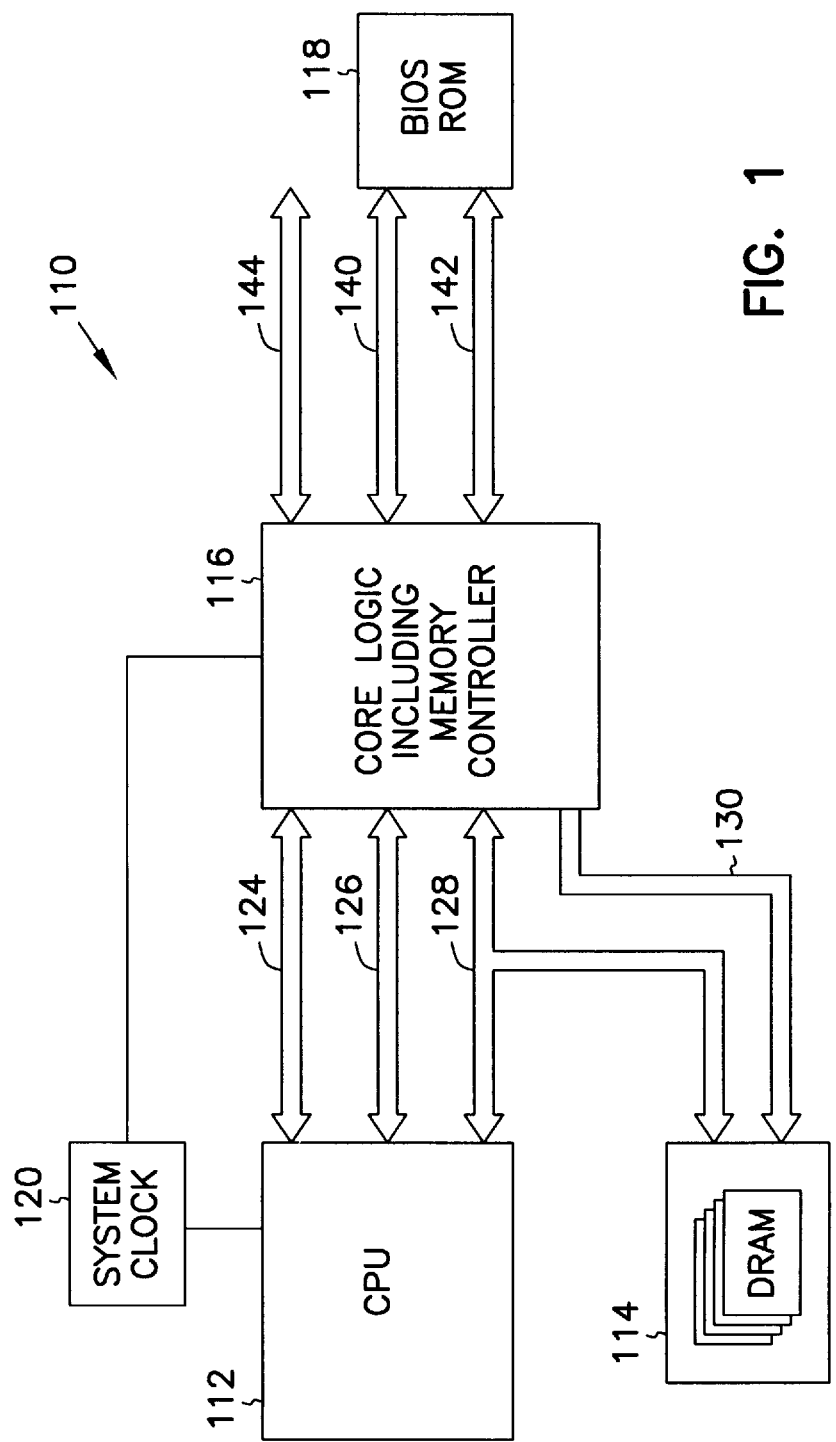
FIG. 1 is a block diagram illustrating a typical personal computer system.

FIG. 1 shows a basic personal computer system at 110 with a central processing unit (CPU) 112, memory system 114, memory controller and core logic 116, and a basic input/output system (BIOS) ROM 118. A programmable system clock 120 provides timing pulses to at least the CPU 112 and the memory controller to synchronize both devices for transfer of data. CPU 112 is coupled to the memory controller 116 by a control bus 124, address bus 126 and data bus 128.

Memory controller 116 in one embodiment is an application specific integrated circuit (ASIC) part number 82C465MV from Opti Corporation. It is coupled to the DRAM 114 by data bus 128 and a memory address bus 130 through which it requests data from the DRAM 114 and provides refresh signals to ensure that the data in DRAM is refreshed and does not dissipate. The memory controller 116 is also coupled to BIOS 118 via Industrial Standard Architecture bus ISA Data bus 140 and ISA address bus 142. Memory controller 116 also provides for control of the ISA bus via an ISA control bus 144.

Memory controller 116 contains several registers for storing system configuration information. In particular, several registers are used to specify whether parity will be used, the memory size for each bank of memory, refresh rates and the number of wait states for the memory controller to initiate prior to informing CPU 112 that data satisfying a memory request is available from DRAM 114, or will be available during the next CPU cycle. This information is passed on to the CPU by means of lowering a NOT READY line in control bus 132. The CPU, in the following cycle will then latch the data from DRAM 114 near the end of the cycle.

When the personal computer system is switched on, BIOS 118 provides instructions to CPU 112 causing it to run through a series of system checks or "diagnostics" to test if a number of essential system components exist and are functioning properly. The BIOS also provides commands for storage of parameters that are necessary in order for computer programs to run. For instance, information such as input/output ports, type of display monitor, system clock speed, and number of wait states must be provided before a personal computer system is operational. These parameters can be modified as the software or hardware needs of a user changes.

The memory access wait states for given CPU speeds is given in table form in FIG. 2. The first column of information is the CPU speed, given in megahertz. The second column is for the DRAM speed in providing data, the third column describes the number of CPU cycles that must pass prior to the data being available for use by CPU 114. Note that there are four numbers in the third column. The first number corresponds to the number of cycles for a first access in a row of DRAM 114 memory. The second, third and fourth numbers correspond to the number of cycles to wait for sequential access to data in the same row, but perhaps in a different column. The fourth column in the table corresponds to the number of wait states that a CPU should execute following the sending of a write request to memory controller 116.

In FIG. 3, the proper programming for a DRAM control register indicated generally at 310 is shown. DRAM control register 310 is one of many DRAM setup registers for containing setup values for the DRAM 114 as described above. An index value of 35 h is used by BIOS to address and store data in the bit positions shown. Bits 7 and 6 of the 8 bit register contain the number of wait states which are used by memory controller 116 to control its NOT READY line 132 during a memory read operation. The values bits 7 and 6 may have is indicated under the bit positions in the table, and refer back to the table in FIG. 2. Thus, a setting of "11" in bit positions 7 and 6 correspond to cycle times of 5-4-4-4 with a CPU clock speed of 50 MHz in FIG. 2. This means that data will not be ready for the CPU until the 5th cycle during a read operation on a new row of data, or until the 4th cycle on subsequent consecutive access to the same row. The number of wait states are one less than each of the cycle times, as the cycle times indicate the cycle in which the data will be available. Memory Controller 116 thus raises NOT READY 124 for 4 cycle times, which causes the CPU, such as an Intel Corporation based x86 processor to execute another T2 cycle or wait cycle/wait state, which essentially is a holding pattern of no real processing. During the 5th cycle, NOT READY is lowered, and the CPU latches the data from DRAM 114 towards the end of the cycle.

In one embodiment, the control of the number of memory wait states is done through a system management mode (SMM) portion of BIOS. On start up of the computer, a user is given a predetermined amount of time to select a control panel for informing the computer of configuration changes. This allows a user to provide information on new memory or peripheral devices. The present invention provides some additional parameters for the user to select. The user can either select a different processor speed, or, for normal users who do not need to understand, they can select a power conservation mode. Either of these selections will cause both the clock 120 to be reprogrammed to a different cycle speed from that found in a CPU nonvolatile memory or from the clock chip, and cause the number of wait states to be modified in register 310 of memory controller 116. In a further embodiment, the user may directly modify the number of wait states by changing them in a user modifiable table. A system management interrupt will then ensure that register 310 is reprogrammed correctly. Values outside the range of acceptable values will be rejected. In addition to access to the control panel at start up, an icon or command may also be provided, and the control panel invoked by mouse or keyboard commands.

In a further embodiment, BIOS is shadowed in the DRAM 114. In this embodiment, all access to the specified ROM space are redirected to the corresponding DRAM location. Thus, the power conservation icon or command may result in commands from DRAM being executed to bring up the control panel. In this manner, BIOS from DRAM may be executed by the CPU to provide the wait state control of the present invention. Thus, the invention may be embodied in several different storage medium, from ROM diskette, tape, CD and other magnetic and optical storage medium to transmission into storage via network where it may be temporarily stored in switches, satellites, wires and other transmission medium on its way to storage in a personal computer or workstation, all as represented by memory system block 114.

Processor speeds are increasing much more rapidly than memory access speeds. The invention will also be useful as applied to level 2 cache memory systems. Such cache memory systems were originally designed to ensure that no processor wait states were required However, current and future processor cycle times are increasing so much faster than memory speeds, the invention will find great use with respect to cache memories to increase the performance of computers during power conservation modes which reduce cycle times.

Figure 4:
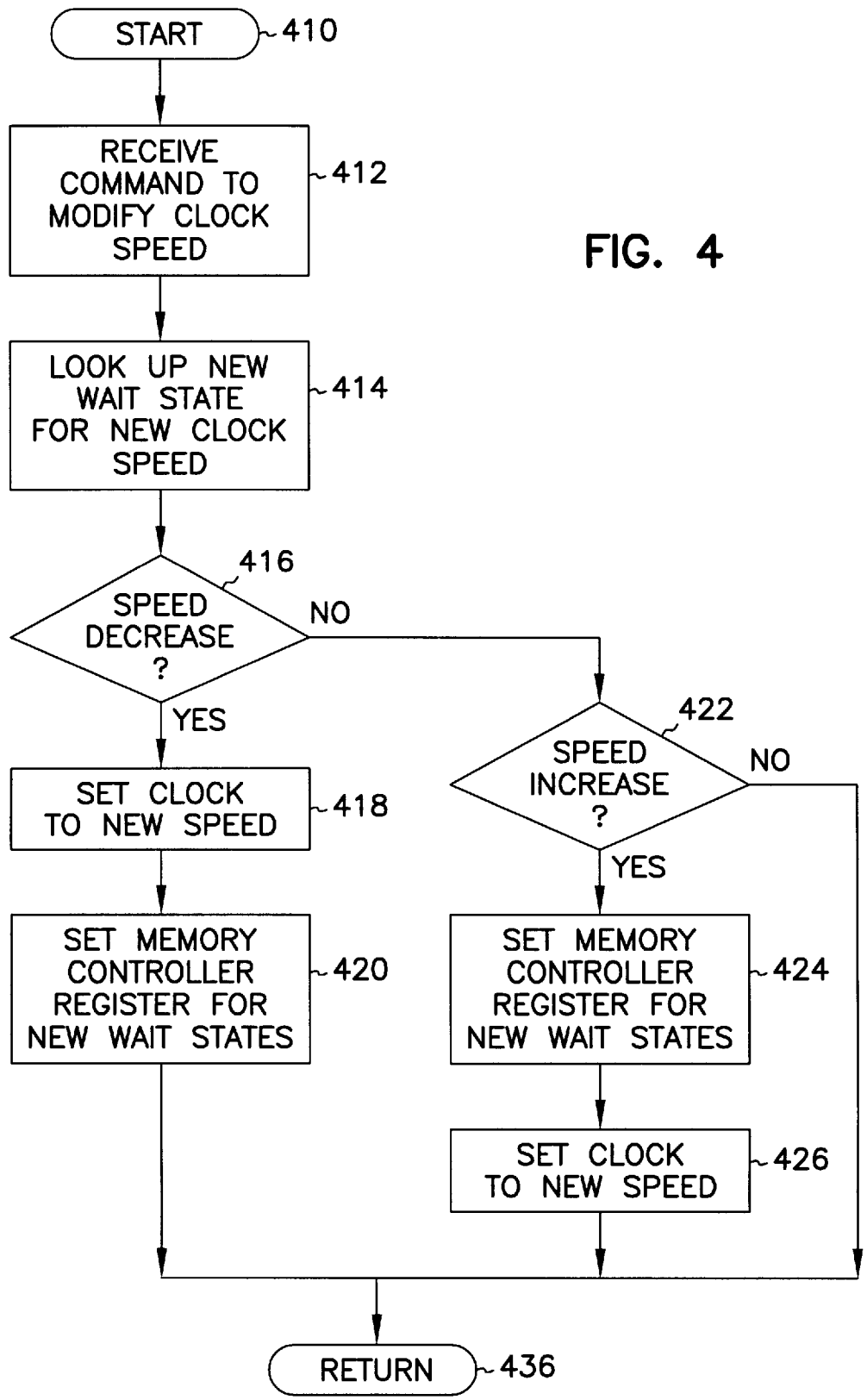
FIG. 4 is a flow chart illustrating the steps to be performed in order to modify the clock speed in accordance with the present invention.

In FIG. 4, a high level flowchart is shown describing the steps involved in modifying the number of memory wait states in response to changes in clock speed. Upon receiving a command to modify the power level or other command that results in a modification to the speed of the processor clock, the CPU executes the routine shown starting at 410. In a further preferred embodiment, a coprocessor or other type of processing unit may execute the routine to modify system parameters. As discussed above, a modifiable table may be presented to the user with options for either modify the number of wait states directly, selecting a power conservation mode, or modifying the processor clock speed directly at 412 when the initial command is received. At 414, if the speed of the clock has been requested to be modified by the initial command or subsequent user selection, new wait states corresponding to the new processor clock speed are determined by table lookup from the table in FIG. 2. At 416, if there is a request to decrease the speed of the clock from the current setting, a register for controlling the clock speed is set at 418, and the memory controller register is set for the new wait states at 420. If there was not a request to decrease the speed, it is determined at decision block 422 whether or not the request was for an increase in the speed of the clock. If yes, the memory controller register is set for the new wait states as 422 and then the clock is set to the new speed at 426. If there was no speed increase requested at 422, then there was no request to change the speed of the clock and control is returned at return 436.

In addition to the user of a system directly selecting power conservation which results in lower clock speed, the reduction in clock speed may also result from other methods of control. In one embodiment, the clock speed is reduced after a certain predetermined period of time of inactivity. If no user commands are issued, or no applications are running, at a selectable time, perhaps 2 minutes, a command to conserve power is issued to the wait state routine of FIG. 4. At the first instance of a user command or an application being initiated, a command is provided back to the wait state routine to increase the clock speed, resulting in the wait states being modified back.

While the invention was described in connection with various embodiments, it was not the intent to limit the invention to that emnbodiment. On the contrary, it is the intent to cover all alternatives, modifications and equivalents as may be included within the spirit and scope of the invention as defined by the appended claims. Many other embodiments will be apparent to those of skill in the art upon reviewing the above description. Accordingly, it is apparent that modifications can be made to the apparatus and method for using same without departing from the teaching of the present invention.

What is claimed is:

1. A method of improving performance in a power-managed computer system having a minimum number of memory access wait states, the method comprising the steps of:

(a) detecting a request to change a clock speed of said system;

(b) determining if implementation of said request requires an increase in said clock speed; and (c) adjusting the minimum number of memory access wait states based on said request and prior to implementing said request.

2. A method of improving performance in a power-managed computer system having a minimum number of memory access wait states, the method comprising the steps of:

(a) detecting a request to change a clock speed of said system;

(b) determining if implementation of said request requires a decrease in said clock speed; and (c) implementing said request; and (d) adjusting the minimum number of memory access wait states based on said request.

3. A computer-readable memory containing a computer program for causing a computer to perform the following steps:

(a) detect a request to change a clock speed of said system (b) determine if implementation of said request requires an increase in said clock speed; and (c) adjust the minimum number of memory access wait states based on said request and prior to implementing said request.

4. A computer-readable memory containing a computer program for causing a computer to perform the following steps:

(a) detect a request to change a clock speed of said system (b) determine if implementation of said request requires a decrease in said clock speed; and (c) implement said request; and (d) adjust the minimum number of memory access wait states based on said request.

5. A computer system comprising:

a central processing unit;

a memory for storing programs and data;

a clock having at least two clock speeds; and a memory controller coupled to the central processing unit, the memory, and the clock for accessing the memory in response to a request from the central processing unit to change the clock speed, for determining if the request requires an increase in said clock speed, and for adjusting the minimum number of wait states prior to implementing the request, before informing the central processing unit that the data is available.

6. The computer system of claim 5, wherein the memory controller further comprises a register which is loadable with a number representing the clock speed dependent number of wait states by the central processing unit.

7. A computer system comprising:

a central processing unit;

a memory for storing programs and data;

a clock having at least two clock speeds; and a memory controller coupled to the central processing unit, the memory, and the clock for accessing the memory in response to a request from the central processing unit to change the clock speed, for determining if the request requires a decrease in said clock speed, and for implementing the request prior to adjusting the minimum number of wait states, before informing the central processing unit that the data is available.

* * * * *